United States Patent [19]
Lovett et al.

[11] Patent Number: 5,652,838
[45] Date of Patent: Jul. 29, 1997

[54] SMART DISC CD-ROM

[76] Inventors: Donna M. Lovett; Robert R. Lovett, both of 1304 S. Linden, Wichita, Kans. 67207

[21] Appl. No.: 650,481

[22] Filed: May 20, 1996

[51] Int. Cl.$^6$ ........................................... C06F 11/00
[52] U.S. Cl. ........................................... 395/186; 360/135
[58] Field of Search .................. 395/186, 188.01, 395/491, 438, 428, 488; 380/3, 4, 5; 360/135; 235/436; 361/683

[56] References Cited

U.S. PATENT DOCUMENTS

| | | | |
|---|---|---|---|
| 4,471,163 | 9/1984 | Doanld et al. | 178/22.08 |
| 4,599,489 | 7/1986 | Cargile | 178/22.08 |
| 4,672,182 | 6/1987 | Hirokawa | 235/436 |
| 4,685,055 | 8/1987 | Thomas | 364/200 |
| 4,697,184 | 9/1987 | Regelsberger | 340/572 |
| 4,734,796 | 3/1988 | Grynberg et al. | 360/60 |
| 4,771,462 | 9/1988 | Hannan et al. | 380/44 |
| 4,866,769 | 9/1989 | Karp | 380/4 |
| 4,888,798 | 12/1989 | Easnest | 380/4 |
| 4,918,631 | 4/1990 | Hara et al. | 364/708 |
| 4,980,782 | 12/1990 | Ginkel | 360/60 |
| 5,033,084 | 7/1991 | Beecher | 380/4 |
| 5,199,066 | 3/1993 | Logan | 380/4 |
| 5,267,311 | 11/1993 | Bakhoum | 380/4 |
| 5,337,357 | 8/1994 | Chou et al. | 380/4 |
| 5,341,421 | 8/1994 | Ugon | 380/4 |
| 5,371,792 | 12/1994 | Asai et al. | 380/3 |
| 5,465,381 | 11/1995 | Schmidt et al. | 395/800 |

OTHER PUBLICATIONS

"Magnetic Recording Disk File With Silicon Substrate Disk Contaning Both Integrated Electronic Circuits and Magnetic Media", IBM Technical Disclosure Bulletin, vol. 28, No. 7 pp. 2861–2862. Dec. 1985.

*Primary Examiner*—Robert W. Beausoliel, Jr.
*Assistant Examiner*—Joseph E. Palys
*Attorney, Agent, or Firm*—Bradley P. Sylvester

[57] ABSTRACT

A CD-ROM, that is adapted for the protection of electronically transmitted data, comprising a CD-ROM, having a hub containing a battery power supply and a microprocessor, which receives signals from several laser light sensors, located on the read area of the CD-ROM. The computer communicates directly with this CD-ROM by positioning the laser so that it strikes specific laser light sensors, with the order of sensors struck used by the computer to communicate directly with the CD-ROM. The CD-ROM communicates information to the computer, via the user who reads information on a liquid crystal display readout, located on the CD-ROM, and types in the information on the computer keyboard. This CD-ROM is used as a personalized key, for both installing and updating programs for continued use.

13 Claims, 1 Drawing Sheet

SMART DISC CD-ROM

BACKGROUND OF THE INVENTION

There has been a great deal of effort made to prevent the unauthorized transfer or use of software. The efforts are often directed toward three main areas of concern for software developers. The first concern is to create a security means that cannot be easily determined or circumvented by end users. The second concern, is to create a security system that can be inexpensively manufactured and yet operate on a software program that has many identical copies. A third concern, is to create a security system that offers protection for software that is sold or distributed through computer networks.

Prior methods of protection from unauthorized software use, have involved supplying the user with a set of passwords, that are designed to respond to specific queries from the software, prior to use. If the user has the proper answer to the query, then use is authorized. These methods are easily circumvented, by simply transferring the set of passwords, and to which query they respond, on to unauthorized users.

Sophisticated methods have also been implemented, in an effort to restrict software access. U.S. Pat. No. 4,683,968 (Appelbaum et at) described a system in which a portion or all of the software was encrypted in code form. When a user requested access to the software, the computer underwent several steps, including communicating with a software protection module, to determine if the proper access code was available. The software protection module contained a unique code that allowed the computer to perform a decryption procedure on the protected software. Each module was preprogrammed with a unique code, and constructed in such a manner, so that any physical tampering would irrevocably damage it. One of the drawbacks to this system, was that the unique code was placed into the module at the time of manufacturing, which made the process more difficult and costly. Also, there was an undesired time delay while the application was decrypted.

Using software encryption as a means of keeping the software protected, was also used in U.S. Pat. No. 4,187,140 (Chandra). In this invention, the software was broken down into an encrypted form, and the decryption could only take place when a physically secure token transferred the key to the computer. The user could make as many backup copies of the program as they wanted, but since the software remained encrypted, the copies were unusable unless the decrypt token was also present.

Hardware devices continue to play an important role in protecting software, but the hardware devices must have the security code placed in the hardware unit prior to shipping. This creates higher production costs. In U.S. Pat. No. 5,081,676 (Chou), a hardware device was used, in which a permanent first key was placed. A second key, contained in either the same hardware or the software was used, in conjunction with the first key, so that a control key could be established.

In U.S. Pat. No. 5,182,770 (Medveczky), a system was disclosed, in which two separate identification codes were used. One of the codes was associated with the application program, and the other code associated with a hardware unit. The various codes were derived from the software serial number, and a code placed into a connecting hardware unit. Using both of these different codes, a security access code was able to be verified.

A similar approach was done in U.S. Pat. No. 5,222,133 (Chou), in which a plug-in hardware device contained a single or set of unique first keys. A second key was used with the first unique key to derive a control key. Identical copies of software were protected together with the hardware devices, with each software application having its own hardware protection device.

The problems with the prior art is that unique codes or keys had to be placed into various hardware devices, prior to their distribution. This method of protection was ensured, only if each permanent key was unlike any other, or was designed so as to work with only one type of program. Previous hardware devices, while interacting with the software, have been required to be physically connected to the computer system, such as a communications port of a computer. These unique codes had to remain intact, with regard to any codes included in the software, since software was generally copied at the point of manufacture, and sold to the end user on a diskette or other memory storage media. If the hardware did not have a unique code, then the protection could be easily circumvented.

Further use of the hardware was generally limited by the number or type of permanent codes it had. Update programs had to be anticipated, at the time of the hardware unit's manufacture, or a new hardware unit would have to be included with unanticipated updates and new applications.

Efforts have been made, to have codes that were preselected, and assigned a specific unit of time in which the code would operate as an access code. In U.S. Pat. No. 5,168,520 (Weis), a hardware device contained a set of codes that were individually selected as access codes, according to a specific time interval given in the hardware programming.

Other methods have used a personalized identification number (PIN) that the user obtained from the manufacturer, similar to a number used to gain money from a bank machine using a credit card. The overriding problem with this type of method was that the protection obtained from the use of a PIN was lost, once the PIN was disclosed to others.

As the "information highway" continues to grow, computer services and sales of software are now able to be accomplished using modems, communication network computers, satellites, infrared, and duplication by write once/read many drives (also known as "CD Recorders") which are capable of writing information directly onto CDS. One of the benefits of increased computer/modem activity, is that sales and transfer of information can be accomplished without the need to inject physical storage devices, such as program disks into commerce. The middleman is rapidly becoming a network computer, rather than a physical store.

With so much information available through network systems, it is common practice for users of various services to download programs from a network system, and use the software without paying for anything more than phone and log on time with the computer network system. The software developers lose profits, and there is a decrease in incentives to create more software. Use of a PIN to give protection has obvious shortcomings, since network users are able to transfer both the software and the PIN along to other users of the computer network.

The protection necessary for software distributed over network computer systems, requires an access key, that can be individually mass produced, but is linked to a single software program at the time of the software's installation onto a computers hard drive. In addition, communication between the computer and the access key should include a means whereby the user cannot easily ascertain all of the information being transferred.

SUMMARY OF THE INVENTION

It is an object of this invention to provide a software protection system where an interactive optically read SMART DISC CD-ROM ("SD CD-ROM") and any form of data transmitted electronically, are encoded with a shared set of code variables and corresponding code symbols, which provide coded information exchange between the SD CD-ROM and the electronically transmitted data.

It is a further object of this present invention to provide a SD CD-ROM that is able to communicate with a computer system, using the position of the disc drive laser, and a means to detect the position of the laser, as it scans the SD CD-ROM, to convey information directly to the SD CD-ROM.

It is a further object of this present invention to provide a means where a single SD CD-ROM is linked to a single software application, at the time of the software's first installation and use on the computer hard disk drive.

It is a further object of this present invention to provide a software protection system, that can provide protection to more than one program at a time.

It is a further object of this present invention to provide a software protection system, that requires additional use of the SD CD-ROM, to update the protected software, at various time or use intervals.

It is a further object of this present invention to provide a software protection system, that allows a SD CD-ROM to store encoded information, received from the computer system, and display information to the user, for transfer back into the computer keyboard by the user.

In a broad aspect, this invention relates to a SD CD-ROM that can be identically mass-produced, yet be individualized for use as an install and update key for a specific software program.

The SD CD-ROM has many components similar to a standard CD-ROM. The SD CD-ROM, however, has a hub that contains: a microprocessor; a battery power supply; a visual display; and a series of light sensitive sensor areas located at various points on the read-portion of the SD CD-ROM. These light sensitive areas are activated when a laser beam, such as that emitted from a CD-ROM disc drive laser, strikes the light sensitive areas during rotation of the SD CD-ROM in the drive bay. A visual display such as a liquid crystal display ("LCD") is fixed to the hub's outer side walls, and wraps radially around the periphery of the hub, so that it does not extend outward from the disc's axis of rotation into the area traditionally occupied by that portion of the disc scanned by an optical laser.

Previously, the hub in a traditional CD-ROM has been constructed of the stone plastic that the rest of the disc is constructed from, and has a hole centrally located in time disc. The SD CD-ROM's plastic hub has the included components situated within, which are sealed in the plastic during the hub's formation.

The SD CD-ROM housing contains one or more light sensitive areas, that are situated so they are able to be shuck by the read laser in the drive bay. The light sensitive areas are located on the part of the SD CD-ROM that is traditionally used to store scannable information, so that these areas are not with the hub area, but positioned at various incremental distances away from the axis of rotation. A plurality of light sensitive areas are necessary, so that the scanning of the laser can be detected at several points during rotation of the SD CD-ROM. While several light sensitive areas may be used, preferably at least four are present. With four light sensitive areas, the movements of the laser can be detected, so that a complex code can be generated. Although many ways to convey coded information exist, preferably three of the four light sensitive areas will be scanned to input coded information, with the fourth light sensitive area functioning as the input that signifies an end to a particular set of code variables.

When the SD CD-ROM is spinning within the drive bay, each time the laser scans an area occupied by a particular light sensitive area, the sensor is activated and sends information to the microprocessor, which determines and records the location of the laser strikes on the SD CD-ROM.

When a SD CD-ROM is placed into a CD-ROM drive bay, the disc motor begins to spin the SD CD-ROM. Generally, most CD-ROM drives spin the disc from 200 to 550 revolutions per minute ("RPM"). The variation in RPM rates is due to the fact that a disc spilling at a set speed will allow information near the periphery of the disc to be read at a much faster rate than information closer to the hub. In order to read information at a constant rate, disc drive motors must be able to adjust the rate of speed to allow all positions on the SD CD-ROM to be read at a fairly uniform rate. When the laser is scanning the peripheral region of the SD CD-ROM, the disc drive motor may be operating at its lowest speed. As information is scanned on the portion of the SD CD-ROM closest to the hub, the speed of the disc drive motor will increase.

Since laser positioning is critical to the SD CD-ROM, the SD CD-ROM must determine that the laser in the disc drive bay scans the area of each of the light sensitive areas properly. When the SD CD-ROM is inserted into the computer CD-ROM drive, a command within the program being installed instructs the reading laser to do an initial series of scanning or read attempts at specific areas on the SD CD-ROM read area. For example, the laser would first be instructed to scan four different areas corresponding with the four laser scan positions. Each area is scanned for a certain time increment, to be certain that the light sensitive areas will be struck by the laser approximately three to nine times during each one second of spinning, and that they actuate properly. This insures that the light sensitive areas are functioning properly, and the laser is properly positioning itself.

Once the number and location of each laser reading is detected and verified, then the computer can communicate with the SD CD-ROM, using the positioning of the laser as it scans a spinning SD CD-ROM. The SD CD-ROM communicates information to the computer via the user, who reads information on a LCD, and types in the information on the computer keyboard.

The SD CD-ROM is used to both install software programs, and as an update protection system. Both the SD CD-ROM and the protected software program have a unique set of algorithms or code variables and corresponding code symbols encoded, prior to interaction between them. Generally, the SD CD-ROM would receive this information at its point of manufacture, with the protected software receiving the identical information prior to the time it is made available for distribution. If the software is being distributed on CD-ROM or floppy diskettes, then the coded information can be encoded at the time of manufacture. If the software is being distributed through a computer network system, then the coded information can be encrypted within the program itself. If the protected software program is received entirely through a modem, then the SD CD-ROM would be the only tangible item distributed, which would allow access to programs, using a modem.

Prior to completing the installation of a protected software program, the SD CD-ROM randomly selects an algorithm, that is identified by an operation code. The algorithm is performed on a set of code symbols and code variables so that an identical code key is created in both the SD CD-ROM and the software in the computer system. This code key will be unknown to the user, and individualized to a particular software program and SD CD-ROM. The algorithm can be simple to extremely complex, depending on the wishes of the software developer.

The computer communicates information to the SD CD-ROM, using the detection of laser light, emitted from the drove bay laser, as it scans specific areas of the SD CD-ROM. The SD CD-ROM sensors detect the scanning laser's positions, and decodes/translates the information into a first code, and a second code, which are stored in the SD CD-ROM's microprocessor memory. After this is done, the SD CD-ROM will erase all prior numbers or codes used for prior installations, so that the SD CD-ROM crux only be linked to that particular software program that is currently being installed.

After the SD CD-ROM has received and stored the first and second codes, the computer instructs the user to take the SD CD-ROM out of the disc drive, and type the information shown on the LCD into the computer keyboard. The information shown on the LCD will be the first code. The second code is not available for display at this time. When the user types in this information, the computer verifies the information received, to see if it matches the information given by the computer to the SD CD-ROM using the laser positioning and scan method. If the information typed into the computer by the user matches, then the computer allows complete installation, access and use of the software program.

The second code is not available for display on the SD CD-ROM until an update is required. Updates are required according to the software developer's design, which can require updates after a preset number of software uses, time of software use, or the passage of actual time.

After a predetermined time period has passed, the computer determines that it will not allow access to the software program, unless it receives the proper update code. The computer will instruct the user to insert the SD CD-ROM into the disc drive. The SD CD-ROM is inserted into the drive bay, and the computer determines a new update code, and transfers this information to the SD CD-ROM using the laser's positioning and scan method.

The SD CD-ROM receives the new update code, and writes it over the file storing the code previously typed into the computer for comparison. (In the case of a first update, the first code is overwritten, since it was previously used to install the program.) As the SD CD-ROM receives additional update codes, it will store them, by overwriting the new information in the first code file, or the second code file, alternating back and forth, so that the information already used is the information overwritten.

After the SD CD-ROM receives a new update code, the LCD displays the other update code that it previously received. (In this case, during a first update, it will be the second code.) The user is instructed to type in this information, using the computer keyboard. Once the computer receives this information, it will be used as the identification serial number to unlock an update file, and release the coded information, supplying the software program with the necessary data that allows continued use of the software. Once this is accomplished, the computer erases the update file on the hard disk drive that it just released information from.

The newly generated update code is not accessible until a future update is required by the software. The newly generated update code functions as a new identification serial number for a locked file, which is stored on the computer hard disk drive. Once this is done, the computer erases the new update code in its random access memory (RAM). The SD CD-ROM and computer will go through identical steps, as indicated above, with a new update code being generated at each update request. The SD CD-ROM will continue to write the new update code over the update code already used, prior to disclosing the unused update code to the user.

If the SD CD-ROM is used to install the identical software program on a second computer system, it will erase all update serial number information during the installation process, so that cannot be used again with the former identical software program. When the former identical program requires an update, it will not have a SD CD-ROM With the necessary information available to complete the update.

The SD CD-ROM can be used to protect several different types or numbers of non identical software programs at one time. The protection can extend to any type of electronically transmitted data, using binary code, such as software programs, movies, games, or any type of electronic data that can be downloaded from computer systems using modems or other data transfer means. The required matching algorithms must be stored within the SD CD-ROM's microprocessor, and the software or data sought to be protected. Selection of which program is being installed can be made by the computer CD-ROM drive, using the laser positioning and scan method, prior to communication of update coded information.

DESCRIPTION OF THE PREFERRED EMBODIMENT

Figures 1, 2:
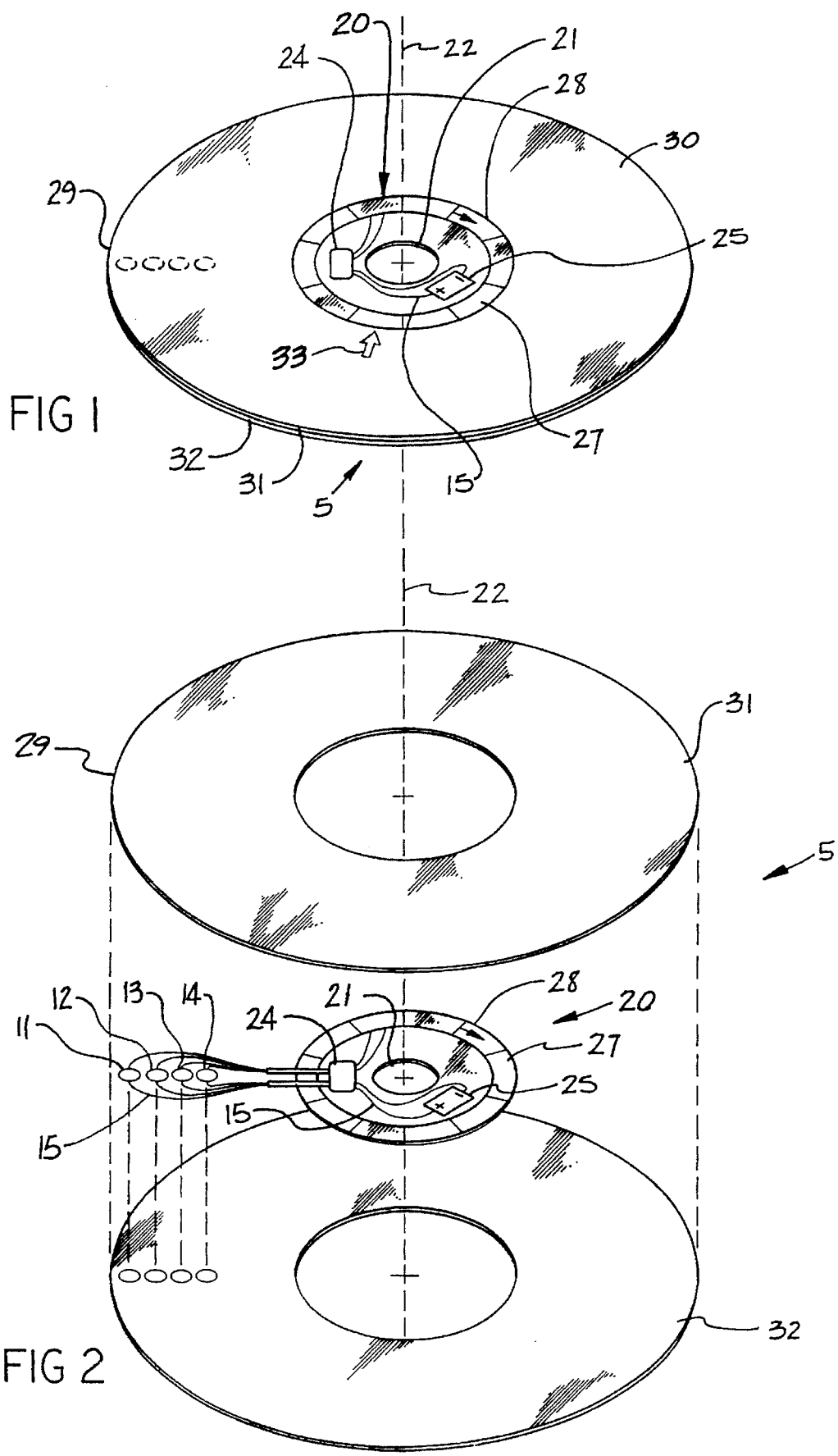
FIG. 1 is a perspective view of the SD CD-ROM.
FIG. 2 is an exploded perspective view of the SD CD-ROM showing the top and bottom layers, the hub, and the sensors.

This invention is intended to provide protection for any kind of electronically transmitted data, comprising software programs, audio-visual input information and any type of data that is capable of being transmitted using modems, communication network computers, satellites, infrared, or disc-type storage and transfer method. Typically, the invention would have a primary use for protecting software programs, that are installed using CD-ROMs, or programs downloaded from computer networks. The invention could also be used to allow the sale or transfer of various informations/data to the user who possess a SD CD-ROM.

Referring to FIG. 1, a SMART DISC CD-ROM ("SD CD-ROM") 5 is shown, depicting a flat circular disc plate 30, with a centrally located hub 20, that is circular in shape, with the disc plate 30, fixed to the hub 20. The hub 20 may be enclosed in the stone material that comprises the disc plate 30, so that the contents of the hub 20 are protected from external degrading forces. The central area of the hub 20 defines a spindle hole 21, designating the axis of rotation 22 when the SD CD-ROM 5 is spinning.

Referring to FIG. 2, which shows an exploded peripheral view of the SD CD-ROM 5, the top layer 31 and bottom layer 32 are shown, that when pressed together make up the flat circular disc plate 30. At least one layer 31 or 32 must be optically transparent, so that the scanning laser light can reach the light sensors 11, 12, 13 and 14 which are positioned between the top layer 31 and bottom layer 32. Light sensors 11, 12, 13 and 14 may be positioned anywhere on the flat circular disc plate 30 area that is typically scanned by the laser, but they are preferably near the peripheral edge 29, so as to leave a substantial portion of the SD CD-ROM 5 available for data writing.

The flat circular disc plate 30 comprises the area available for scanning by a laser (not shown), and extends radially outward from the hub 20, with its peripheral edge 29 forming a circle. The flat circular disc plate 30 can contain data, in the form of pits and lands on a reflective layer that is adhered to the bottom surface. When a laser light source is directed to the reflective layer, the reflections received are recognized by a reading lens, so that the computer processor can convert the reflections into binary code.

The hub 20, may be constructed of metal or other protective substance, but it may be preferable that it be constructed as a cavity that is created when the top layer 31 and bottom layer 32 are pressed together to form the flat circular disc plate 30 portion of the SD CD-ROM 5. If this plastic material is used, the battery power supply 25 and microprocessor 24 can both be located inside the plastic material, so that they are protected from external physical contact. In addition, any connecting wires 15 that link the battery power source 25 to the microprocessor 24 or any of the laser light sensors 11, 12, 13 and 14, are likewise embedded between the top layer 31 and bottom layer 32, so that they are also protected.

The microprocessor 24 is connected individually to each light sensor 11, 12, 13 and 14, through wires 15, and receives data from each individual light sensor 11, 12, 13 or 14, anytime a laser beam emitted from the laser in a CD-ROM disc drive strikes them. The microprocessor 24 and light sensors 11, 12, 13 and 14 are all powered by a battery power source 25, which is also located within the hub 20. Preferably, the battery power source 25 and microprocessor 24, are positioned in the hub 20 area, so that when the hub 20 is rotated or spun, the centrifugal force will not cause the hub 20 to be out of balance, or cause it to move erratically during the spiraling inside a disc drive (not shown).

The microprocessor 24 has encoded within it code variables and corresponding code symbols. The identical information is likewise encoded in the software or data sought to be protected. Generally, the SD CD-ROM 5 would receive this information at its point of manufacture, with the software or data receiving the identical information prior to the time it is made available for distribution. If the software is being distributed on CD-ROM or floppy diskettes, then the coded information would be encoded at the time of manufacture. If the software is being distributed through a computer network system, then the coded information would be encrypted within the program itself.

The code variables comprise various combinations and sequences of the actuation of light sensors 11, 12, 13 and 14, that are actuated when struck by the disc drive laser. Whatever the amount of code symbols and code variables being used, it is necessary that both the microprocessor 24 and the protected software have this identical information encoded within each of them.

A display means, comprising a liquid crystal display ("LCD") 27 surrounds the hub 20, but preferably does not extend into the area designated for information storage. The LCD 27 has a plurality of readout areas, so that one or more symbols or alpha/numeric characters can be displayed. The LCD 27 may have a fixed point of reference 33, indicating to the viewer where the reading of the data display begins, and/or the LCD 27 may have a floating point of reference 28, which is selected according to the algorithm that is currently being used, and indicated or displayed when data is displayed.

The light sensors 11, 12, 13 and 14 are actuated, when the SD CD-ROM 5 is spun within a disc drive and the scanning laser (not shown) attempts to read data off of a portion of the SD CD-ROM 5 occupied by an individual light sensor 11, 12, 13 or 14. Each of these light sensors 11, 12, 13 and 14 occupy an individualized diameter position, in relation to the axis of rotation 22. This allows a scanning laser that emits a laser beam, to strike only one light sensor 11, 12, 13 or 14 at a time. As the laser moves from the peripheral edge 29 toward the axis of rotation 22, the speed of the SD CD-ROM 5 will increase from approximately 200 RPM to 550 RPM or more. If a laser light beam is directed to a particular area of the SD CD-ROM 5 for at least one second, then the light sensor 11, 12, 13 or 14 can be expected to receive and determine anywhere from three to nine laser strikes. The higher number of laser strikes would apply to a light sensor 11, 12, 13 or 14 that is positioned closest to the hub 20, and is subject to moving at 550 RPM when scanned by the laser. When light sensor 11, 12, 13 or 14 detects a laser beam, this information is communicated to the microprocessor 24, using an electrical impulse through wires 15.

Typically, when a SD CD-ROM 5 is placed into the computer's drive bay, the SD CD-ROM 5 is positioned on a platform, by a spindle which protrudes through the spindle hole 21. The disc motor (not shown) engages the SD CD-ROM 5, and beans to spin it, until a proper operating speed is achieved. Generally, most disc drives spin the disc from 200 to 550 RPM.

Since various computer disc drive systems may have different spin speeds, or position the laser beam slightly different, whenever the SD CD-ROM 5 is used, it may be necessary to first order a determination of the laser beam scanning positioning, to insure that the laser has a beam and position that allows it to actuate the light sensors 11, 12, 13 and 14. These commands can be located on the write portion of the SD CD-ROM 5, or in the software, and is input into the computer system through standard methods.

When the SD CD-ROM 5 is inserted into the disc drive, the computer instructs the computer disc drive motor to do an initial series of operations, involving the scanning of the SD CD-ROM 5 by the laser beam. The laser is instructed to move from the peripheral edge 29 inward towards the axis of rotation 22, pausing for one second at each position on the flat circular disc plate 30 that has a light sensor 11, 12, 13 and 14. One or more of these sensors may be used on a particular SD CD-ROM 5, depending on the user's and developer's needs. In addition, they may be positioned anywhere on the flat circular disc 30 that is subject to being scanned by a laser.

Each time the laser beam strikes one of the light sensors 11, 12, 13 or 14, they are actuated, and the microprocessor 24 detects said actuation. Once the ability of the light sensors 11, 12, 13 and 14 to actuate is verified, using a given disc drive motor and laser to scan the SD CD-ROM 5, the computer can communicate with the SD CD-ROM 5, using an activated laser beam, positioned at specific points over the SD CD-ROM 5. The SD CD-ROM 5 can communicate information to the computer via the user, who reads information displayed on the LCD 27, when the SD CD-ROM 5 is removed from the disc drive, and inputs said displayed information into the computer, typically by typing in the information on the computer keyboard.

When a protected software program is installed, or later updated, use of the SD CD-ROM 5 is always required. Both the software and the SD CD-ROM 5 become individualized to one another through a series of steps that takes place during the initial installation of the software. Only the stone SD CD-ROM 5 will be usable for future updates on that particular software program.

During the initial installation of the software, the SD CD-ROM 5 randomly selects an algorithm, using an identification code. The user is instructed to view the LCD 27, and type the displayed information into the computer. The LCD 27, being circular in shape, and displaying information received from the microprocessor 24, will indicate a fixed point of reference 33, or a floating point of reference 28, that the user is to begin at when reading the information from the circular LCD 27. One or more algorithms encoded in the SD CD-ROM 5, and identically stored in the software, will select and identify the point the user is to begin reading information from the LCD 27. The code symbols and code variables, that are encoded in both the SD CD-ROM 5 and the software provide a starting data set, which after algorithmic steps are performed on it, becomes a key code, individualizing the SD CD-ROM 5 and a single software program to each other. An example of a starting data set is shown below in Table A.

TABLE A

| ORDER OF SENSORS STRUCK | CODE VARIABLES |
| --- | --- |
| 1 4 | 1 |
| 12 4 | 2 |
| 13 4 | 3 |
| 121 4 | 4 |
| 131 4 | 5 |
| 132 4 | 6 |
| 123 4 | 7 |
| 12124 | 8 |
| 12134 | 9 |
| 13124 | 0 |
| 13134 | A |
| 13234 | B |
| 2  4 | C |
| 21 4 | D |
| 23 4 | E |
| 212 4 | F |
| 231 4 | G |
| 232 4 | H |
| 213 4 | I |
| 21214 | J |
| 21314 | K |
| 21234 | L |
| 23234 | M |
| 23124 | N |
| 3  4 | O |
| 31 4 | P |
| 32 4 | Q |
| 312 4 | R |
| 313 4 | S |
| 321 4 | T |
| 323 4 | U |
| 31314 | V |
| 31324 | W |

TABLE A-continued

| ORDER OF SENSORS STRUCK | CODE VARIABLES |
| --- | --- |
| 31234 | X |
| 32324 | Y |
| 32124 | Z |

As indicated in Table A, the first column of data refers to the order of the light sensors 11, 12, 13 and 14 struck, with each individual number referring to the ones place value of the laser light sensor numbers used. For example, in Table A, number 1 refers to laser light sensor 11, number 2 refers to laser light sensor 12, number 3 refers to laser light sensor 13, and number 4 refers to laser light sensor 14.

One of the laser light sensors 11, 12, 13 or 14, in this case being the one designated as laser light sensor 14 in FIG. 2, and designated as number 4 in Table A, is used to indicate an ending to the code being sent or received. Since each laser light sensor 11, 12, 13 or 14 is expected to be struck multiple times by the emitted laser bet on in a single second, the "Order Of Sensors Struck" must not have any immediate repeats of a laser light sensor 11, 12, 13 or 14, as a portion of the code. For example, laser light sensor 11 (designated as "1" in Table A) will be struck at least three times by a laser during a one second interval. If the laser beam next strikes laser light sensor I4 (designated as "4" in Table A), the microprocessor 24 will only be concerned with the order of laser light sensors 11, 12, 13 or 14 actuated, rather than the number of laser beam strikes in a time interval. As soon as laser light sensor 14 (or "4" in Table A) is struck, the microprocessor 24 considers the order in which the laser light sensors 11, 12 or 13, were struck by the laser, since the last time that laser light sensor 14 (or "4" in Table A) was struck. If only laser light sensor 11 (or "1" in Table A) was actuated or struck by the laser beam, since the last time laser light sensor 14 (or "4" in Table A) was struck, then the microprocessor 24 can determine that the first data code variable is "1". If the order of laser strikes went from laser light sensor 13 ("3" in Table A), then 12 ("2" in Table A), then 11 ("1" in Table A) and then back to 12 ("2" in table A), prior to the laser striking 14 ("4" in Table A), then the microprocessor 24 would understand that "3212" had been received, and that particular order of strikes translated into a code variable "Z".

Both the SD CD-ROM 5 and the computer perform the same algorithmic steps on the starting data set of code symbols and code variables, so that an identical code key is created in the SD CD-ROM 5 and the software in the computer system. The algorithmic steps can take any form whatsoever. Table B, shown below, shows an exampled new code key, created from the starting data, in which the positions of the code variables of the starting data, as shown in Table A, have been altered:

TABLE B

| ORDER OF SENSORS STRUCK | CODE VARIABLES |
| --- | --- |
| 1 4 | A |
| 12 4 | 3 |
| 13 4 | 2 |
| 121 4 | 1 |
| 131 4 | C |
| 132 4 | D |
| 123 4 | F |
| 12124 | E |

TABLE B-continued

| ORDER OF SENSORS STRUCK | CODE VARIABLES |
| --- | --- |
| 12134 | 4 |
| 13124 | 5 |
| 13134 | G |
| 13234 | B |
| 2    4 | J |
| 21  4 | I |
| 23  4 | H |
| 212 4 | 7 |
| 231 4 | 6 |
| 232 4 | M |
| 213 4 | L |
| 21214 | K |
| 21314 | 9 |
| 21234 | 8 |
| 23234 | 0 |
| 23124 | P |
| 3    4 | N |
| 31  4 | O |
| 32  4 | T |
| 312 4 | S |
| 313 4 | R |
| 321 4 | Q |
| 323 4 | V |
| 31314 | U |
| 31324 | Z |
| 31234 | W |
| 32324 | X |
| 32124 | Y |

The code key, as exampled above, will be unknown to the user. Since the code key has been created in both the SD CD-ROM 5 and the computer software, it is now individualized to each of them. The code keys can be created by any number or type of algorithm. The greater number of algorithms there are to choose from, creates an increase in the likelihood of individualizing each SD CD-ROM 5 with a single software program.

The software directs the computer to communicate specific information to the SD CD-ROM 5, using the positioning of the laser over the laser light sensors 11, 12, 13 and 14, in relation to the SD CD-ROM 5, to convey code variables directly to the microprocessor 24 which decodes/translates the information into a first code, and a second code which are stored in the microprocessor 24 memory.

Referring also to Table B, as the source of data information, Table C shows that when the light sensors 11, 12, 13 and 14 detects the order of laser strikes, the microprocessor 24 will be able to compute the resulting first code, being 3C6D7PT29J (as an example).

TABLE C

| ORDER OF SENSORS STRUCK | CODE VARIABLES |
| --- | --- |
| 12  4 | 3 |
| 131 4 | C |
| 231 4 | 6 |
| 132 4 | D |
| 212 4 | 7 |
| 23124 | P |
| 32  4 | T |
| 13  4 | 2 |
| 21314 | 9 |
| 2    4 | J |

When this is done during installation of the software program, the computer and the SD CD-ROM 5 will erase all numbers or codes used for prior installations, so that the SD CD-ROM 5 can only be linked to that particular software program that is currently being installed. A second code is created in the same manner as the first code, with the computer transferring both codes to the SD CD-ROM 5 using the laser positioning and scan method described above.

After the SD CD-ROM 5 has received and stored the first and second codes, the computer instructs the user to remove the SD CD-ROM 5 from the disc drive, and type the information shown on the LCD 27 into the computer, using the keyboard. The information shown on the LCD 27 is generated by the microprocessor 24, and will be the first code. As exampled above, the first code is 3C6D7PT29J. When the user types this information into the computer, the computer verifies the information received, to see if it matches the information it gave to the SD CD-ROM 5 using the laser positioning and scan method. If the information typed in by the user matches, then the computer allows complete installation, access and use of the software program.

Updates are required according to the software developer's programming, which can require updates after a preset number of software uses, time of software use, or the passage of actual time. Preferably, the update will be necessary after a predetermined time period has passed. The software will not allow further access to it, unless the proper update code (or second code), is typed into the computer system. The computer will instruct the user to insert the SD CD-ROM 5 into the disc drive.

Once the SD CD-ROM 5 is inserted, the computer determines a new update code, and stores it in RAM, and on the computers hard disk drive, where it is stored as a locked file with a name, but without a discernable serial number. The stone information is also communicated to the SD CD-ROM 5 using the laser positioning and scan method. The SD CD-ROM 5 receives the new update code, and writes it over the file storing the code previously typed into the computer for comparison. (In this case, being the first code, which was used to install the program.) The new first update code, which replaces the original first code, used for installation, is stored in the microprocessor 24 memory of the SD CD-ROM 5.

A time clock (not shown), within the microprocessor 24, will not allow the second code, or future update codes to be displayed, until a specified time period has passed. Once the requisite time has passed, and the SD CD-ROM 5 or microprocessor 24 has been given a new update code, the LCD 27 displays the other yet unused code that it previously received (In this case, it will be the "second code" that is displayed). The user is instructed to type in this information, using the computer keyboard. Once the computer receives this information, it uses it to locate and unlock the update fie on its hard drive, which is also the "second code" in this case. The second code unlocks the locked file on the computer hard disk drive, and allows access to data critical for continued use of the protected software program. If it matches, the computer releases the previously locked information, and allows continued use of the software. The file, once used, is erased or rewritten.

The computer and microprocessor 24 will alternate between the first and second code locations, or the new update code that has been written over them, so that a new and secret code is constantly being shared by the microprocessor 24 and computer software for additional updates.

All newly generated update codes are not accessible until a future update is required, and the requisite time has passed. At each update, the SD CD-ROM 5, its microprocessor 24, and the computer will go through identical steps, as indicated above, with a new update code being generated at each update request. The SD CD-ROM 5 will continue to write the new update code over the last update code used, prior to disclosing the unused update code to the user, so that the microprocessor 24, will alternate between two storage files; one that is accessible, and one that is locked until a future time. The codes are transferred to the SD CD-ROM 5 and microprocessor 24 always through the laser positioning and scan method.

If the SD CD-ROM 5 is used to install another identical software program, the microprocessor 24 automatically erases all update number information dealing with that type of software program during the installation process, so that it cannot be used again with the former software program. When the former identical software program requires an update, the SD CD-ROM 5 will no longer work with it for purposes of updating, since it will not have the necessary current update information available to unlock the file on the hard disk in order to complete the update procedure.

From the foregoing statements, summary and description in accordance with the present invention, it is understood that the same are not limited thereto, but are susceptible to various changes and modifications as known to those skilled in the art and we therefore do not wish to be limited to the details shown and described herein, but intend to cover all such changes and modifications which would be encompassed by the scope of the appended claims.

We claim:

1. An electronic data protection device, for protecting any type of electronically transmitted information comprising:
   (a) a CD-ROM, having a centrally located hub;
   (b) a microprocessor, located in the hub;
   (c) a battery power supply, located in the hub;
   (d) one or more laser light sensors, located on the area of the CD-ROM that can be scanned by a laser when the CD-ROM is spinning in a computer disc drive;
   (e) a display means, located on the CD-ROM that is capable of displaying one or more symbols or alpha/numeric characters.

2. An electronic data protection device, as claimed in claim 1, in which the hub is formed as a cavity as defined by the layers of plastic that comprise the circular disc portion of the CD-ROM, with the microprocessor and power supply sealed within it.

3. An electronic data protection device, as claimed in claim 1, in which the display means is a liquid crystal display.

4. An electronic data protection device, as claimed in claim 1, in which the display means has a designated fixed point of reference.

5. An electronic data protection device, as claimed in claim 1, in which the display means has a floating point of reference indicated or displayed when data is displayed.

6. An electronic data protection device, as claimed in claim 1, in which the microprocessor has a set of one or more algorithms, code symbols and corresponding order of laser light sensor actuations, with identical algorithms, code symbols and corresponding order of laser light sensor actuations stored in the electronically transmitted information sought to be protected.

7. An electronic data protection device, as claimed in claim 1, that can receive information and data from a computer, using the positioning of a light emitting laser over the laser light sensors, with the laser light striking the laser light sensors in specific orders, and where the microprocessor receives and interprets the striking order of the laser light on the laser light sensors.

8. An electronic data protection device, as claimed in claim 1, in which the display means displays information that may be read, and where said displayed information may be input into a computer.

9. An electronic data protection device, as claimed in claim 1, in which the microprocessor has a time clock, that controls when information is to be displayed or disclosed.

10. An electronic data protection device, as claimed in claim 1, where the microprocessor and the electronically transmitted information create a unique first code, that is used to install the any type of electronically transmitted information.

11. An electronic data protection device, as claimed in claim 1, where both the microprocessor and electronically transmitted information create a first code and a second code, that are stored in the microprocessor until needed for an update of the electronically transmitted information, and can create other unique codes required for additional updates.

12. An electronic data protection device, as claimed in claim 1, where the microprocessor can be used to store more that one set of code variables to protect one or more sets of software or data.

13. An electronic data protection device, as claimed in claim 1, where the microprocessor stores code variables that are likewise encoded in the any type of electronically transmitted information, and where said software or data comprises any type of software programs, audio and visual input data, and any data that is transferable using modems, satellites, infrared and disk or CD-ROM storage and transfer.

* * * * *